US007605318B2

(12) United States Patent
Dover

(10) Patent No.: US 7,605,318 B2
(45) Date of Patent: Oct. 20, 2009

(54) GYRO-JIG APPARATUS FOR REPAIRING A STRINGED MUSICAL INSTRUMENT

(76) Inventor: Kent B. Dover, 6506 Springfield Dr., Charlotte, NC (US) 28212

( * ) Notice: Subject to any disclaimer, the term of this patent is extended or adjusted under 35 U.S.C. 154(b) by 0 days.

(21) Appl. No.: 11/881,567

(22) Filed: Jul. 27, 2007

(65) Prior Publication Data

US 2009/0025530 A1 Jan. 29, 2009

(51) Int. Cl.
*G10D 1/00* (2006.01)
*G10D 1/08* (2006.01)
*F16L 3/00* (2006.01)

(52) U.S. Cl. .......................... 84/327; 84/173; 84/267; 248/121

(58) Field of Classification Search .................... 84/327
See application file for complete search history.

(56) References Cited

U.S. PATENT DOCUMENTS 3,840,284 A * 10/1974 Rand .......................... 359/430
4,037,815 A * 7/1977 DeLano ...................... 248/542
4,503,943 A * 3/1985 Tsukui .......................... 188/5
5,202,527 A * 4/1993 Gracie .......................... 84/327
5,381,717 A * 1/1995 Brokaw ........................ 84/327
5,396,824 A * 3/1995 Souza, Jr. .................... 84/327
5,752,684 A * 5/1998 Larkin ..................... 248/188.7
6,030,045 A * 2/2000 Hoshino ..................... 297/461
6,433,265 B1 * 8/2002 McConville ................. 84/327
6,779,805 B1 * 8/2004 Marcus .................... 280/79.11
2005/0016354 A1 * 1/2005 Kent ........................... 84/327

* cited by examiner

*Primary Examiner*—Jeffrey Donels
*Assistant Examiner*—Christopher Uhlir
(74) *Attorney, Agent, or Firm*—Ralph H. Dougherty

(57) ABSTRACT

An improved method and apparatus for safely and securely holding and manipulating a musical instrument for construction or repair, the apparatus for which consists of a base, a pedestal upstanding from the base having an associated vertically adjustable post, an instrument support assembly including an instrument support plate mountable thereon; a holder mounted atop the pedestal for holding the instrument support assembly; clamps for attaching an instrument to the instrument support assembly; a pivot for supporting the instrument support assembly about a vertical axis; a pivot for rotating the instrument support assembly about an axis normal to the face of the support plate; and a gear for rotating the instrument support assembly about a horizontal axis.

10 Claims, 10 Drawing Sheets

GYRO-JIG APPARATUS FOR REPAIRING A STRINGED MUSICAL INSTRUMENT

FIELD OF THE INVENTION

The present invention relates to an apparatus for holding a workpiece, and more particularly to apparatus for holding and manipulating a stringed musical instrument, such as a guitar, mandolin, violin, and the like, for repair or construction.

BACKGROUND OF THE INVENTION

Present devices for holding a musical instrument are awkward, and difficult to manipulate to reach all parts of the instrument being repaired. Because guitars, banjos, mandolins, violas, violins, and other stringed instruments are inherently fragile, it is necessary to hold the instrument securely, while making it possible to manipulate it for the repair person to reach all parts of the instrument, including the sides and back. It is also necessary to hold the neck and fret securely to avoid any possibility of damage from the holding device itself or from the act of manipulating the instrument.

Stringed musical instruments are very fragile, and thus subject to damage whenever excessive stress is placed on any portion of the instrument. During construction and repair of the instrument, proper support is essential to limit stress on any part of the instrument, particularly the neck. This is especially true when working on frets or fingerboards of the instrument.

Additionally, precision articulation or manipulation of the instrument into various positions is important to allow ready access to all portions of the instrument by the person working on the instrument. This must be done without crushing the body of the instrument or creating excess torque on any portion of the instrument, particularly the neck, which is naturally flexible.

Accordingly, there is a need for a device which will readily support a stringed musical instrument at various positions of orientation to allow a craftsman to manufacture, maintain or repair the instrument., and which will position the instrument precisely where desired, which is stable, readily adjustable, and holds the instrument in a position that allows the craftsman to work on the instrument in a position of relative comfort.

DESCRIPTION OF THE PRIOR ART

Applicant is aware of the following U.S. Patents concerning devices for holding stringed instruments:

| U.S. Pat. No. | Inventor | Issue Date | Title |
|---|---|---|---|
| 6,433,265 | McConville | Aug. 13, 2002 | STRINGED INSTRUMENT WORKSTATION |
| 5,396,824 | Souza, Jr. | Mar. 14, 1995 | GUITAR WORK STATION |

Neither of these devices provide the ease of access and firm safe support of the present invention, and the McConville device is extremely complex.

SUMMARY OF THE INVENTION

The invention provides apparatus for supporting a stringed musical instrument at various positions of orientation to allow a craftsman to manufacture, maintain or repair the instrument., and which positions the instrument precisely where desired, which is stable, readily adjustable, and holds the instrument in a position that allows the craftsman to work on the instrument in a position of relative comfort. The apparatus consists of a base which provides mobility and stability; a pedestal upstanding from the base and fixed thereto; a threaded post in the pedestal to provide vertical adjustment; a joint attachment atop and removably fixed to the threaded post; an instrument support plate mounted atop pedestal by connection to and rotatable in the joint; at least one locking device for attaching an instrument to the support plate; a pivot for pivoting the support plate about the axis of the pedestal; and rotational means for rotating the support plate about an axis normal to the support plate.

OBJECTS OF THE INVENTION

The principal object of the present invention is to provide an improved device for holding a stringed instrument firmly to allow work on it.

Another object of this invention is to provide apparatus for manipulating a stringed instrument into any desired orientation of the instrument and allow the craftsman ready access to any portion of the instrument (workpiece).

Another object of the invention is to provide apparatus for holding a stringed instrument which is capable of positioning the instrument precisely where desired by the craftsman.

Another object of the invention is to provide apparatus for holding a stringed instrument which is capable of holding and positioning a variety of stringed instruments of various sizes and shapes.

Another object of this invention is to provide apparatus for holding a stringed instrument which is stable, readily adjustable, and holds the instrument in a position that allows the craftsman to work on the instrument in a position of relative comfort.

An additional object of the invention is to provide a method of securely retaining and positioning a stringed musical instrument of various sizes and shapes, readily adjusting and holding the instrument in a position that allows the craftsman to work on the instrument in a position of relative comfort.

BRIEF DESCRIPTION OF THE DRAWINGS

The foregoing and other objects will become more readily apparent by referring to the following detailed description and the appended drawings in which.

DETAILED DESCRIPTION

Figure 1:
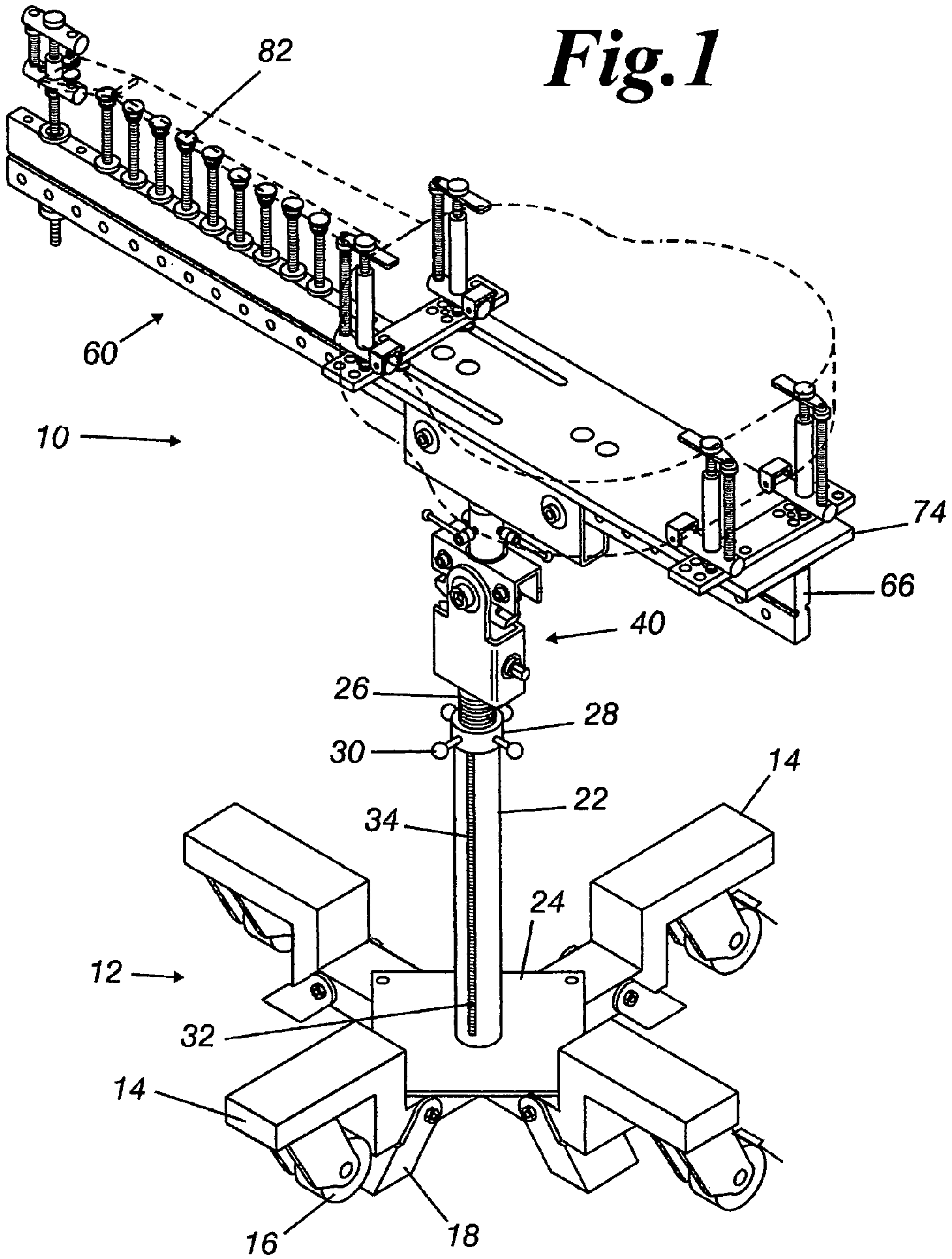
FIG. 1 is an isometric view of a preferred embodiment of the invented workstation apparatus for holding a stringed instrument thereon.
Figure 2:
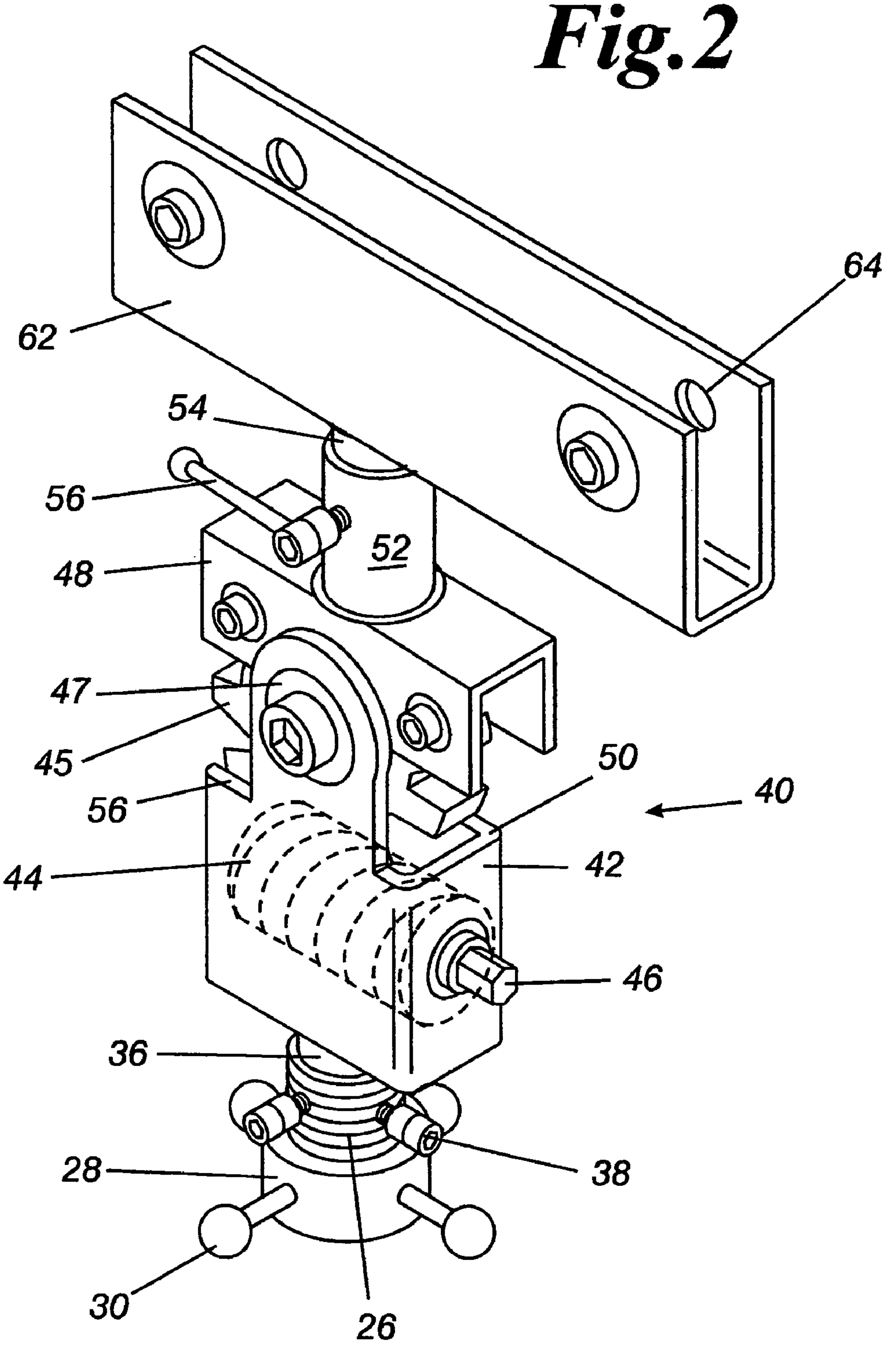
FIG. 2 is an enlarged isometric view of a universal-type joint for allowing movement of the instrument when mounted on the workstation.

Referring now to the drawings, and particularly to FIG. 1, the invented workstation apparatus 10 includes a base 12 which provides stability, a pedestal 22 upstanding from the base and fixed thereto; a threaded post 26 within the pedestal to provide vertical adjustment; a pivotal joint 40 atop and fixed to the threaded post 26; an instrument support assembly 60 mounted atop the pedestal by connection to the joint 40; an instrument support plate 74 mounted on the instrument support assembly 60; and at least one clamping device 78 for attaching an instrument to the support plate; and rotational means for rotating the support plate about an axis normal to the plane of the support plate.

A removable pivot mechanism for pivoting the support plate about the pedestal is provided between the pedestal and the support assembly.

The base 12 is advantageously X-shaped with four legs 14 extending outwardly from the center of the base. Wheels or casters 16 may be provided for mobility. Fold out feet 18 are provided to prevent further movement and allow the base to be held into position. The feet 18 are pivotally attached to the legs 14, as shown. Alternatively, or additionally, a wheel locking mechanism 20 may be provided on the wheels 16 to maintain the workstation in the working position. In order to maintain a low profile and allow ease of access by the craftsman, the legs 14 are advantageously vertically off-set as shown. Alternatively, the base may have from 3 to 6 legs 14, or the base may be circular or square.

Upstanding from the base 12 is a pedestal 22, which is fixed to the base, as by mounting plate 24. Atop the pedestal is a free floating internally threaded collar 28 which receives threaded adjusting post 26, and to which the collar is threadedly engaged. The collar has at least one handle 30 for moving the post 26 vertically by turning the collar. The post has an associated removable stud 32 which rides in an elongated vertical slot 34 in the pedestal. This causes the post to move vertically whenever the collar is turned.

Atop and fixed to the adjusting post 26 is a joint 40, which is pivotally adjustable on two axes. A worm gear housing member 42 is attached to the top of post 26 by a downwardly extending connector post 36 which is inserted into the adjusting post 26 and is fixed into position by locking screws 38. A gear 45 is fixed to second member 48, and is journaled for rotation in bearings 47 in the worm gear housing 42. Member 48 is movable in the vertical plane 180 degrees, 90 degrees in either direction, through the action of worm gear 44, which is controlled by rotating the drive end 46 of the worm gear 44. Worm gear housing member 42 is provided with 90° stops 50 to prevent over-rotation of second member 48.

Extending upwardly from and integral with second member 48 is a tubular receptacle 52 for receiving and holding a mating connecting and support post 54. The tube 52 has at least one locking screw 56 which is advantageously provided with a mating handle.

Instrument support assembly 60 consists of a u-shaped bar holder 62 of which downwardly extending connecting post 54 is an integral part, an elongated bar 66 having spaced holes therethrough in both the longitudinal and transverse dimensions, removable bolts 72 for connecting the bar 66 to the bar holder, an instrument support plate 74 attachable to bar 66 and having holes 75A or slots 75B therein, a sideways-adjusting plate 76 attachable to the instrument support plate 74, a plurality of instrument body clamps 78 attachable to the support plate 74 through the adjusting plate 76, a clamp 80 attachable to the bar for holding the end of an instrument neck, and a multiplicity of neck support pins 82 attachable to the bar for supporting the neck of an instrument. Bar 66 has spaced holes 68 therethrough in the transverse dimension of the bar, and spaced holes 70 in the longitudinal dimension.

The bar holder is provided with holes 64 which are alignable with transverse holes 68 in the bar for insertion of screws or bolts.

The instrument support plate 74 can have any desired dimensions, but must be sufficiently thick to support firmly the instrument to be attached thereto without any flexing whatsoever. Advantageously, the plate can be made of structural aluminum, steel, stainless steel, or even very strong and stiff plastic.

Figure 5:
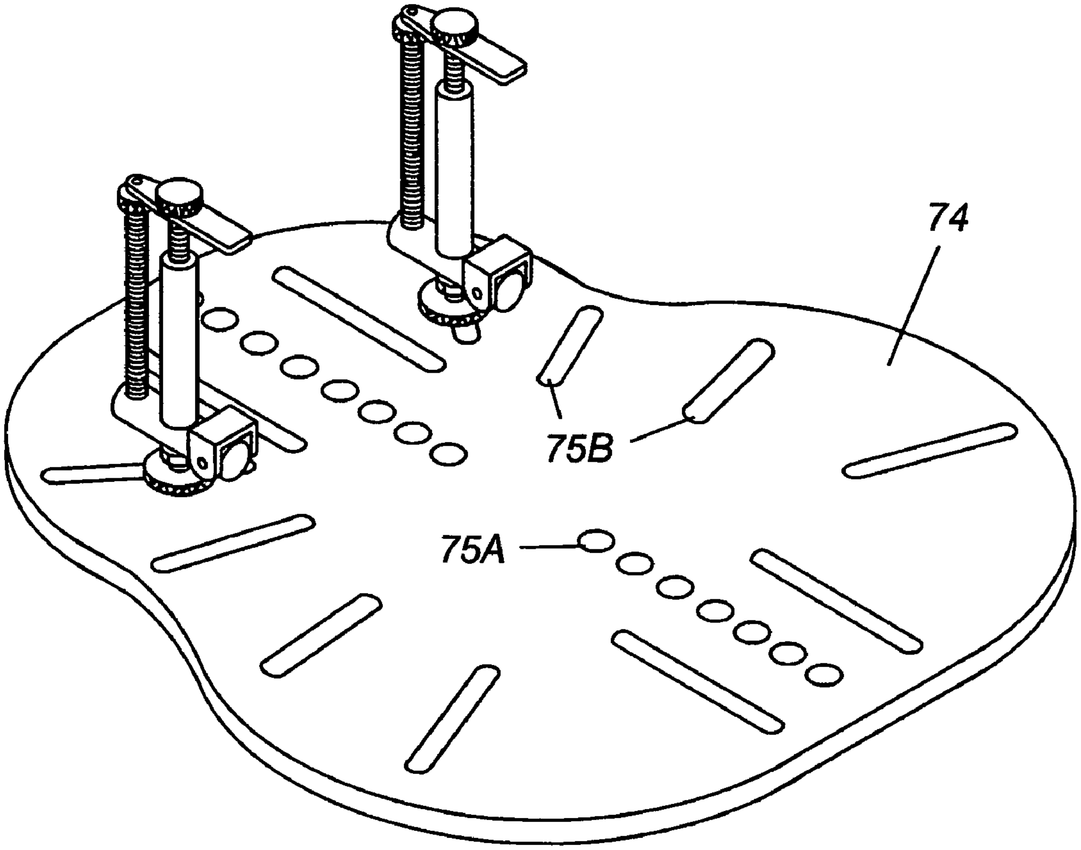
FIG. 5 is an isometric view of an instrument support plate and holdown clamps.
Figure 6:
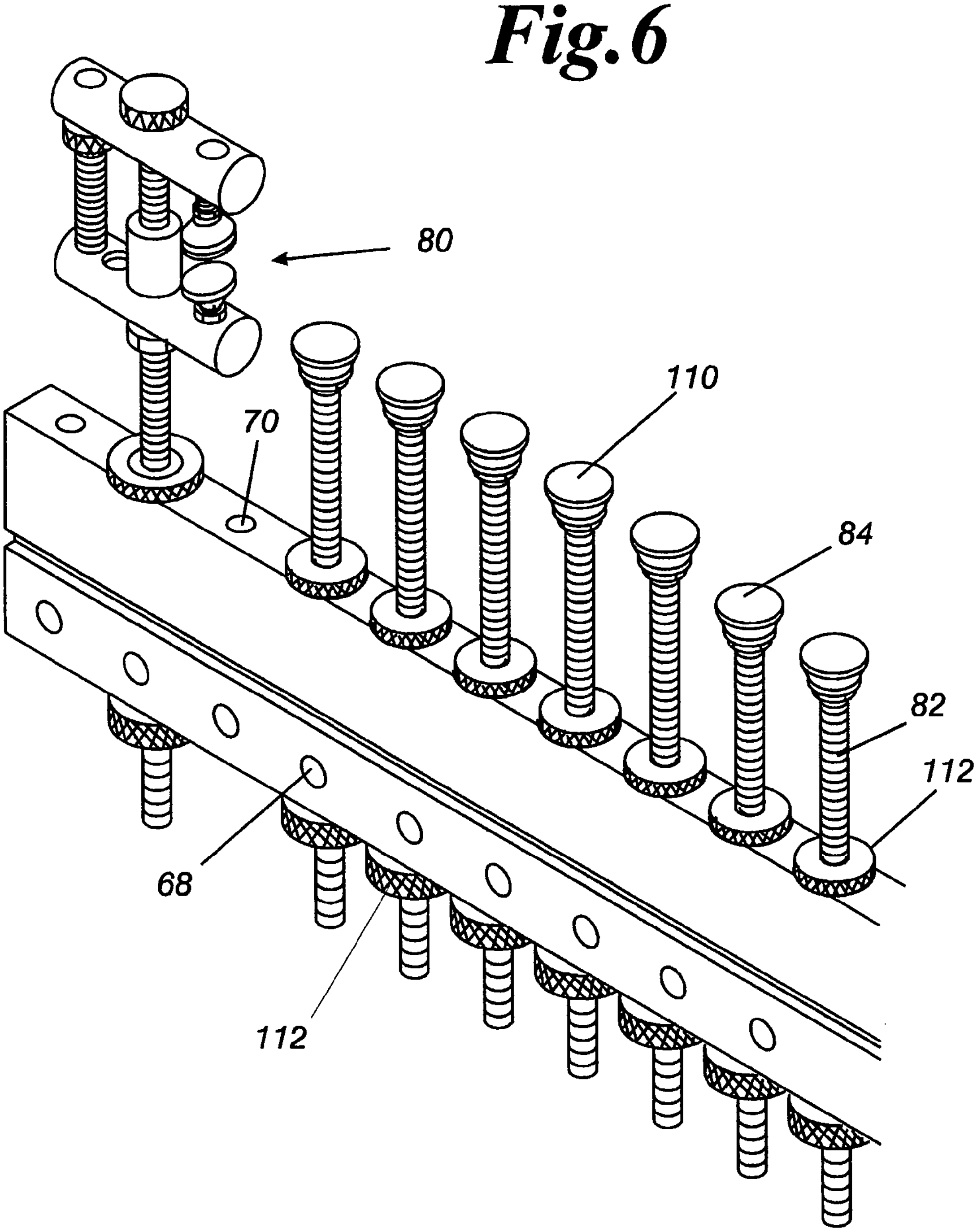
FIG. 6 is an isometric view of a neck rest portion of the invented apparatus.
Figure 7:
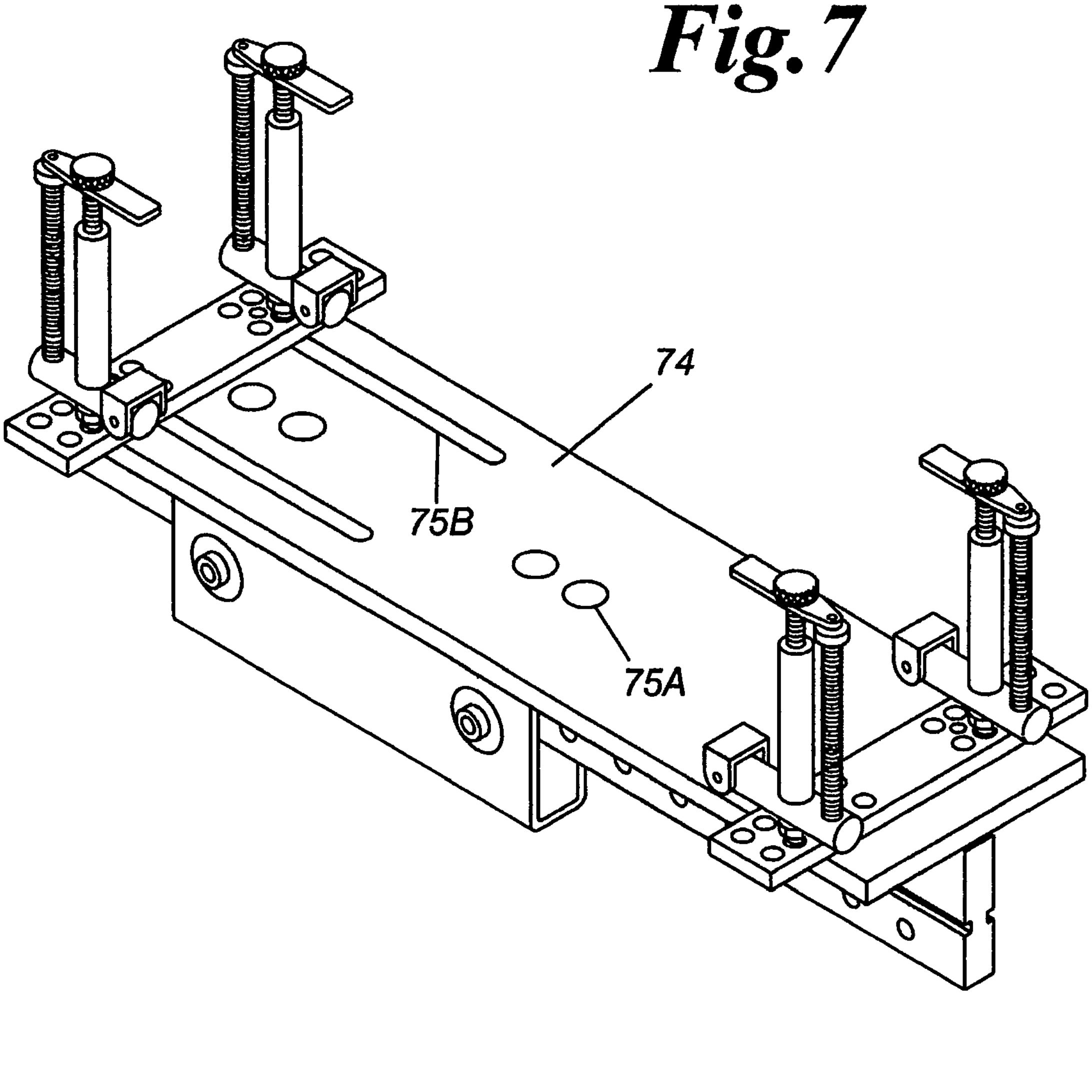
FIG. 7 is an isometric view of an alternative instrument support plate with holdown clamps.
Figure 8:
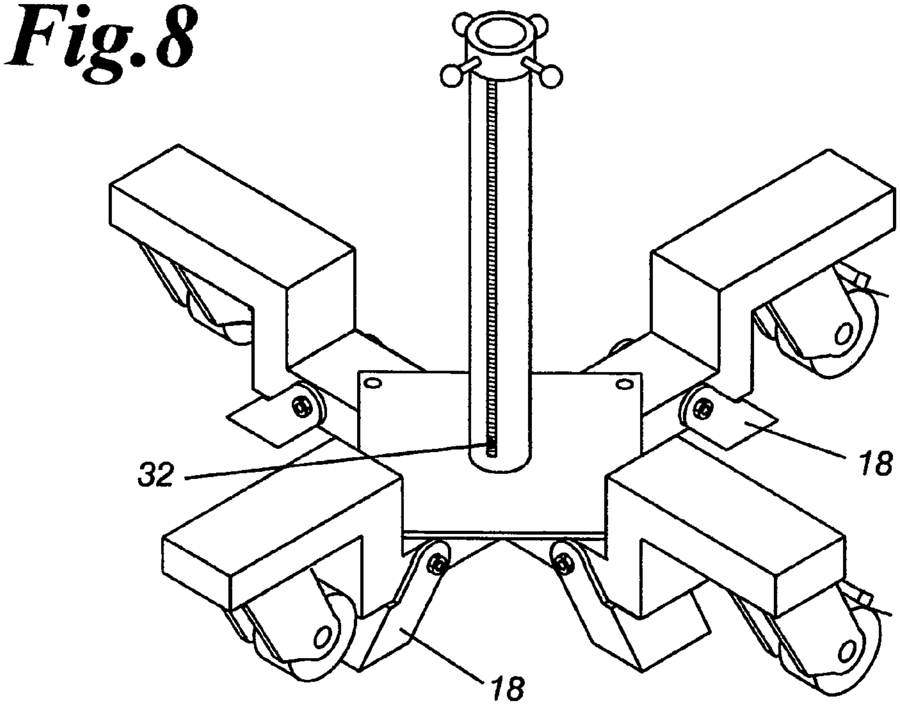
FIG. 8 is an isometric view of the base of the invented workstation apparatus with pivotal base supports in the extended position.
Figure 9:
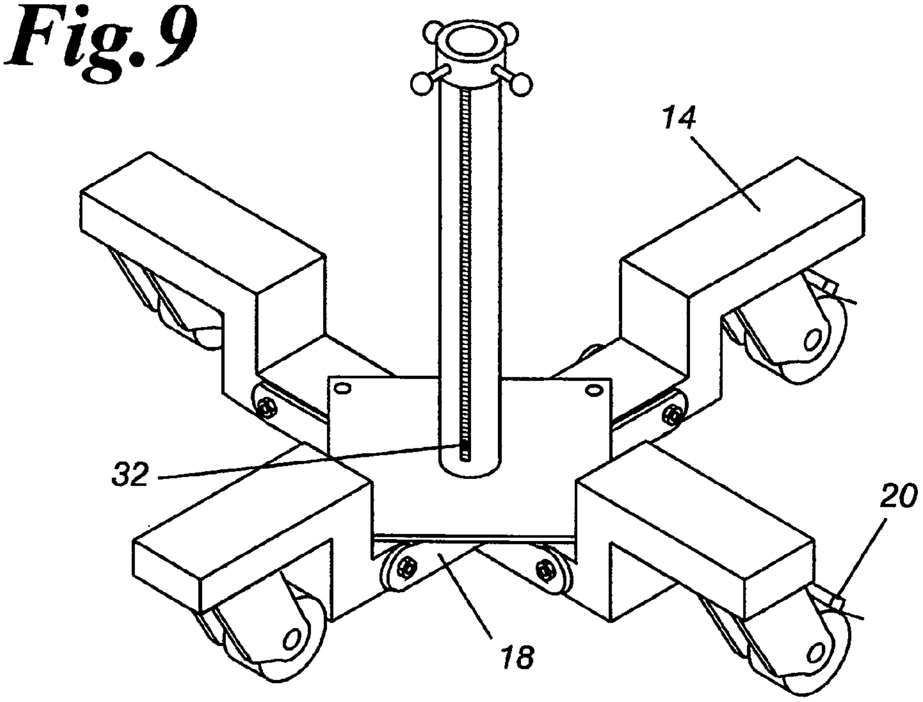
FIG. 9 is an isometric view of the base of the invented workstation apparatus with pivotal base supports in the retracted position.
Figure 10:
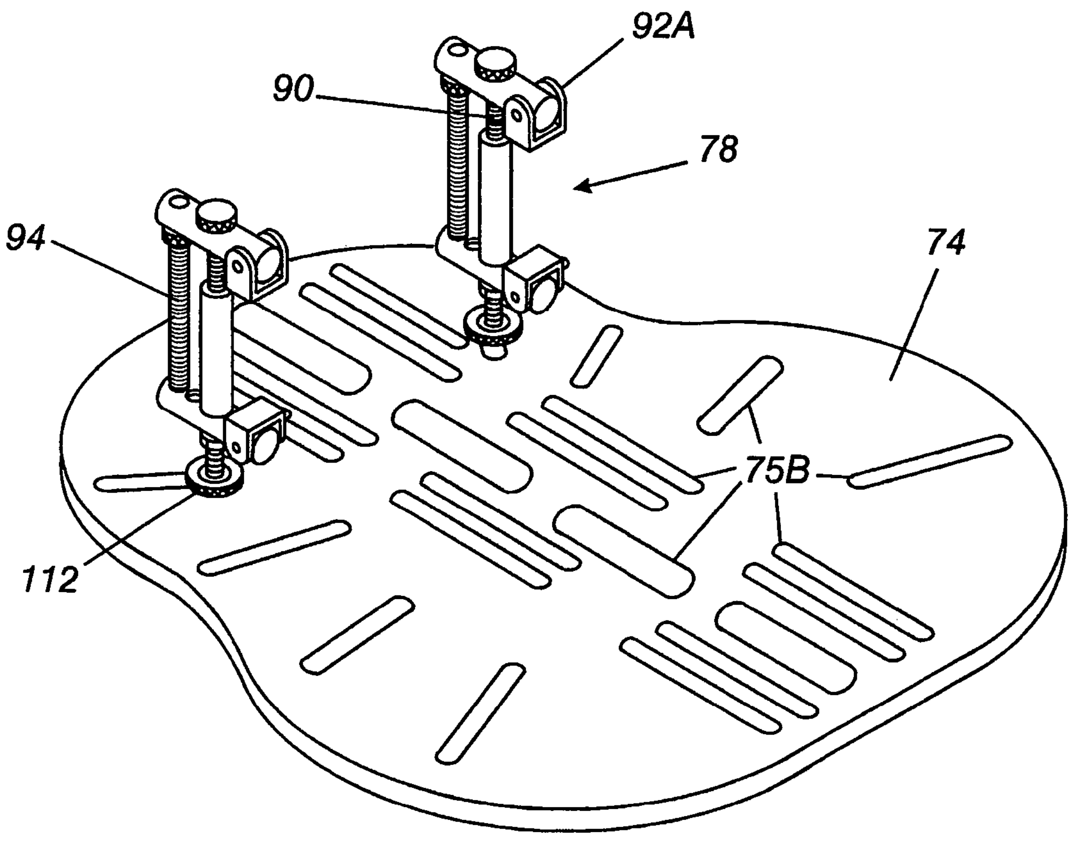
FIG. 10 is an isometric view of an instrument support plate and holdown clamps, which is an alternative to that shown in FIG. 5.

The instrument support plate 74 can have any desired configuration, such as shown in FIGS. 5, 7, or 10. Advantageously, the support plate 74 has a configuration similar to but larger than the outline of the body of the instrument to be mounted thereon. It must extend beyond the instrument body to accommodate the clamps. The support plate can be provided with holes 75A, slots 75B, or a combination thereof to accommodate the clamps 78, and to allow connection to bar 66. The hole/slot configurations shown will accommodate a large range of instrument sizes and types.

Figure 3:
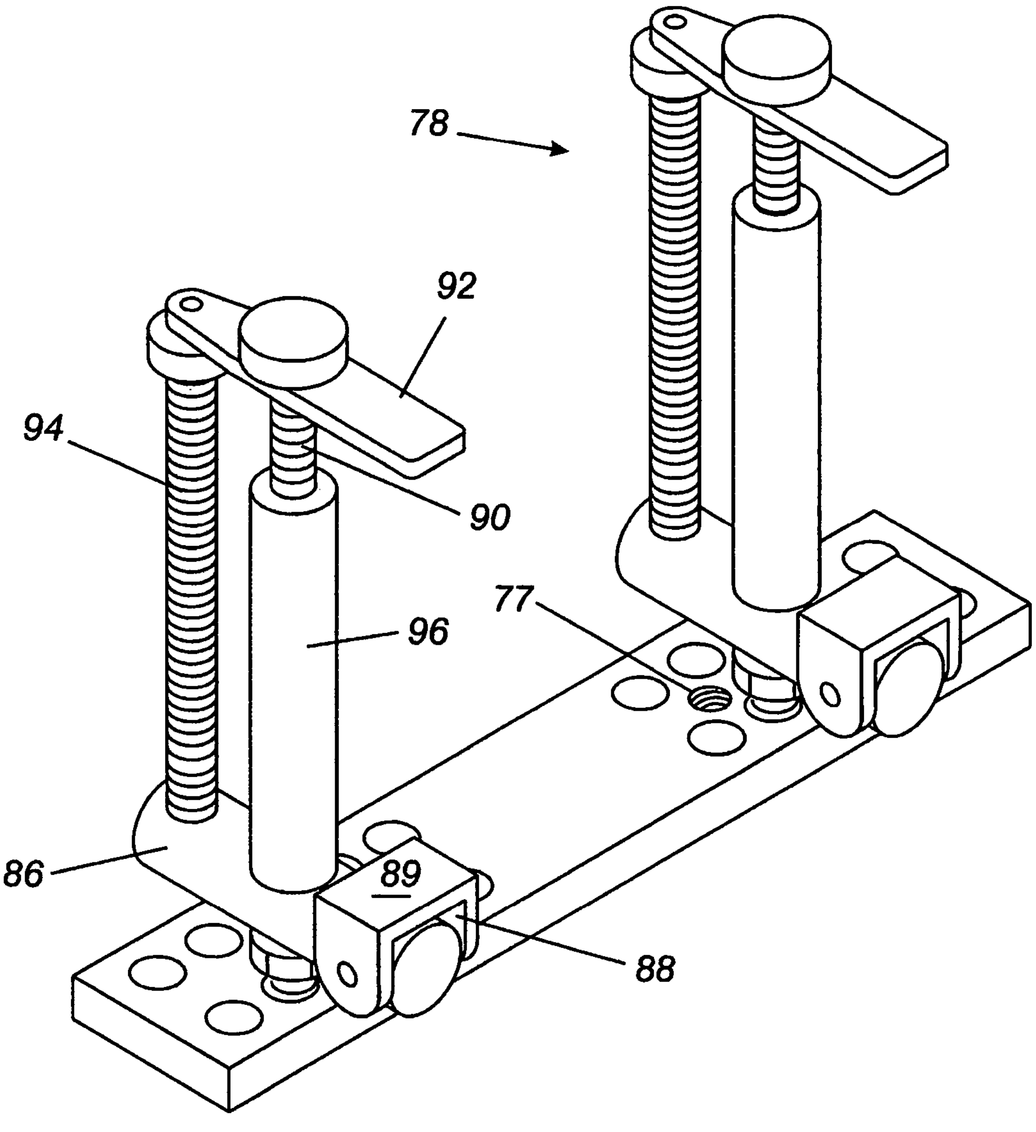
FIG. 3 is an isometric view of a clamping plate and associated holddown clamps for retaining the workpiece securely.

Clamp 78 is illustrated in FIG. 3. The base of each instrument body clamp 78 is attachable to sideways adjustment plate 76, which is itself attached to instrument support plate 74 by bolts into threaded holes 77. The clamp 78 has a base jaw 86, with a pivotal instrument contact member 88 at the end thereof. Member 88 may have a cushioning face 89 such as cork or other similar substance which will contact the instrument surface. The base jaw 86 is engaged by a threaded support 90 for holding upper instrument contact member or jaw 92, and by a threaded thumbscrew 94 which bears against the underside of the end of the jaw 92 remote from the instrument to clamp the instrument tightly.

Figure 4:
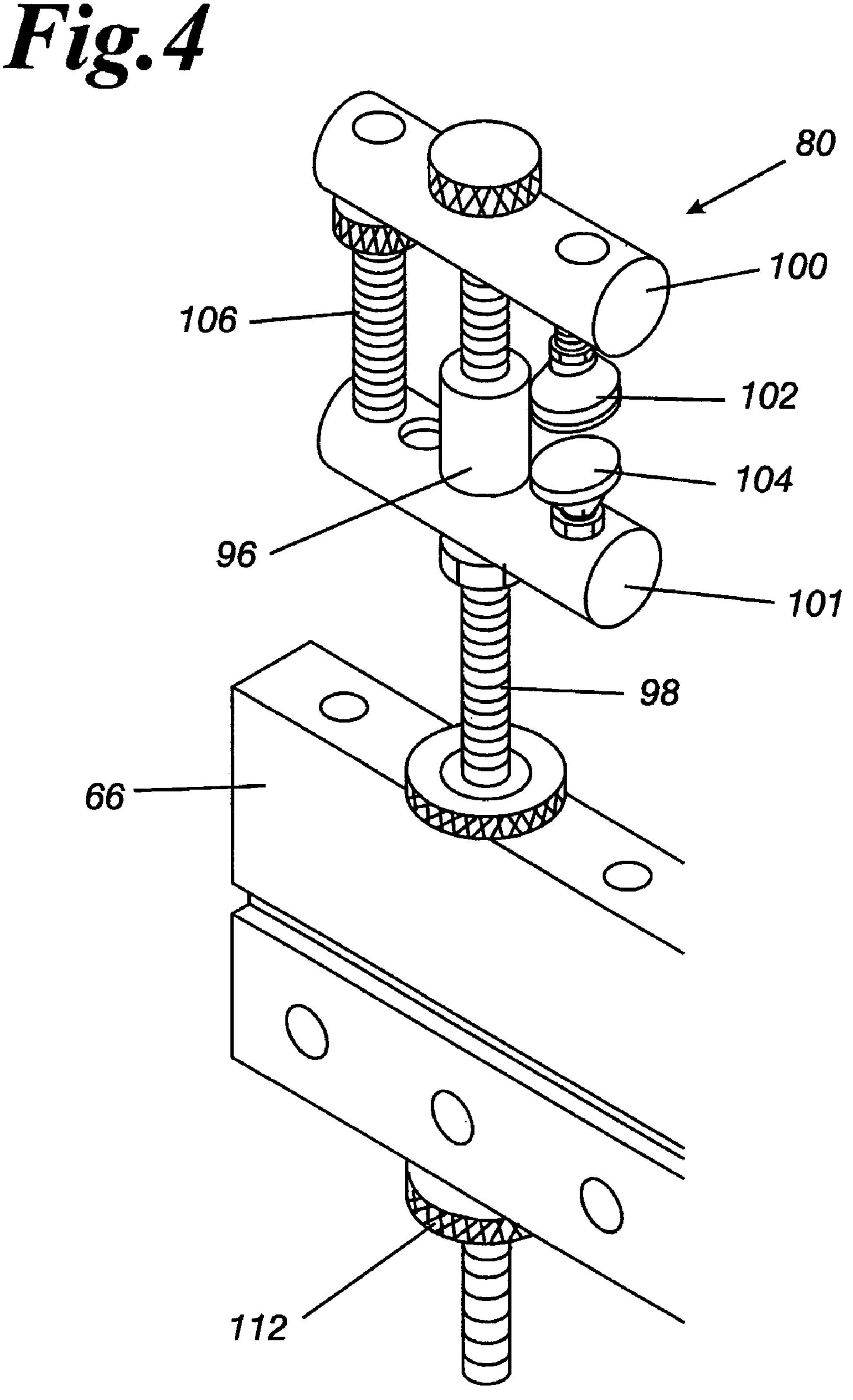
FIG. 4 is an isometric view of an end clamp for an instrument neck, which is mounted on a support bar, and has pivotal holding pads.

The clamp 80 for holding the end of an instrument neck is shown in FIG. 4. It has a different configuration from clamp 78, as illustrated in FIG. 4. This clamp is attachable to bar 66 by a central threaded bolt 98 and has upper and lower jaw beams 100, 101, respectively. Each jaw beam is provided with a removable pivotable contact member 102, 104, for contacting the end of the neck of the instrument to be held therein. Thumbscrew 106 provides the necessary bearing pressure on the contact members to hold the neck safely and securely. Advantageously, cushioning tubes 96 cover the threads that might come into contact with the instrument to avoid damage or scratching of the instrument body.

Neck support pins 82 are attached to the bar 66 at intervals therealong in the vertical or longitudinal holes 70. Each pin has a pivotal and removable head 84, and a contact pad 110 thereon for contacting the instrument neck. Jamb nuts 112 on the pin 82 above and below the bar 66 hold each pin securely in the desired position, and can easily be re-situated as the need arises. As many pins as the craftsman deems necessary are placed on the bar 66 to support the instrument neck.

In operation, the proper location of the instrument is determined on a horizontally arranged instrument support plate 74, and is attached into position on the plate 74 utilizing the appropriate clamps and neck pins. The instrument may be manipulated by elevating the adjustable post 26 in the pedestal, by rotation of the instrument support plate up to 360 degrees about a vertical axis, that is, about the axis of connector post 56, by tilting the instrument support plate to a desired angle with the worm gear 44, and by rotating the instrument support plate up to 360 degrees about the axis of connector post 54. This allows the craftsman to have ready access to any portion of the instrument to manufacture, assemble, repair, or recondition it.

Alternative Embodiments

The pedestal could be internally threaded to receive the adjusting post, in which case the collar 28 would be fixed to the post or a turning handle would be fixed to the post, and the stud 32 would be omitted.

The tilt unit or joint 40 can be removed whenever the craftsman desires to work on a horizontally oriented instrument.

Clamps 78 can be employed as shown in FIG. 5, where the clamps 78 are affixed directly to the instrument support plate by the used of jamb nuts 112 on threaded jaw support 90 both above and below the instrument support plate 74.

An alternative clamp 78A is depicted in FIG. 10. The clamp 78A has a base jaw 86, as in FIG. 3, but has an upper jaw which has the same components as the lower jaw, as shown. This clamp operates in the same manner as clamp 78, with a threaded support 90 for holding upper instrument contact member or jaw 92A, and by a threaded thumbscrew 94 which bears against the underside of the end of the jaw 92 remote from the instrument to clamp the instrument tightly.

Figure 11:
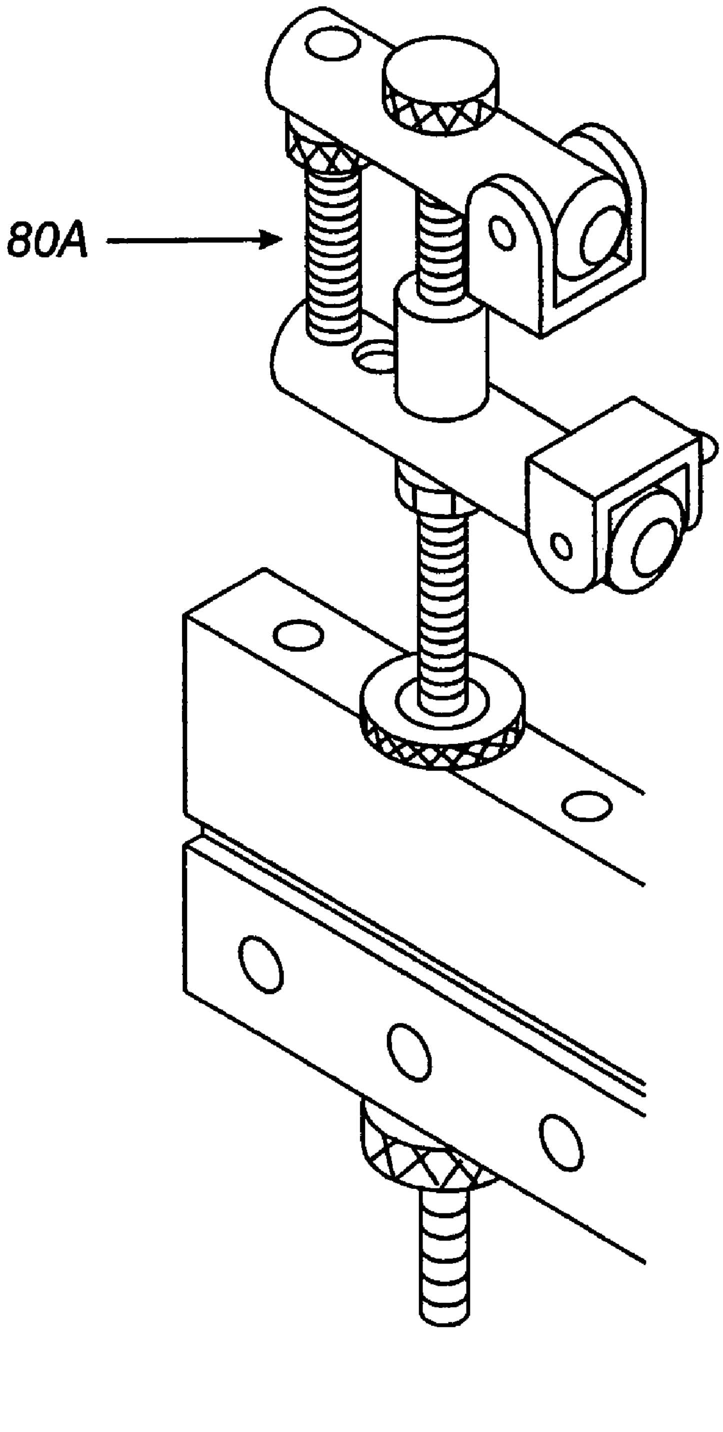
FIG. 11 is an isometric view of an end clamp for an instrument neck, which is mounted on a support bar, and has an alternative style of pivotal holding pads.

The clamp 80A shown in FIG. 11 has a longer lower jaw than upper jaw, which will avoid an undesirable torque effect on the instrument neck.

Summary of the Achievement of the Objects of the Invention

From the foregoing, it is readily apparent that I have invented an improved apparatus for holding and manipulating a stringed instrument into any desired orientation of the instrument and allow the craftsman ready access to any portion of the instrument, which is capable of positioning the instrument precisely where desired by the craftsman, which is capable of holding and positioning a variety of stringed instrument of various sizes and shapes, which is stable, readily adjustable, and holds the instrument in a position that allows the craftsman to work on the instrument in a position of relative comfort.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. Apparatus for securely holding and manipulating a workpiece for construction or repair, comprising:

a fixed and stable base:

a pedestal fixed to and upstanding from said base, and having a vertically adjustable threaded post therein, means atop said pedestal and engaging said threaded post for moving said post vertically as desired, and means for locking said post into a desired position;

a workpiece support assembly;

means mounted between said pedestal and said workpiece support assembly for rotating said workpiece support assembly about a horizontal axis while holding the workpiece securely, comprising a first member having a worm gear housed therein, means for rotating said worm gear, a second member having a second gear fixed thereto and engaging said worm gear, whereby rotation of said worm gear moves said second member through an arc;

means atop said pedestal for holding said workpiece support assembly which is U-shaped, and is removably attached to said pedestal;

means for securely attaching an workpiece to said workpiece support assembly;

means for pivoting said workpiece support assembly about a vertical axis while holding the workpiece securely; and mechanical means integral with said pedestal for moving said workpiece support vertically.

2. Apparatus according to claim 1, wherein said base has a plurality of fixed legs projecting radially.

3. Apparatus according to claim 2 wherein said base has associated wheels for mobility.

4. Apparatus according to claim 3 wherein said base is provided with stabilizing means for preventing mobility, said stabilizing means being a fold-out base support pivotally attached to each of said legs about a horizontal axis, which when pivoted into the stabilizing position raise the wheels to prevent their contact with a floor.

5. Apparatus according to claim 1 wherein said means for holding said workpiece support assembly is U-shaped, and is removably attached to said pedestal.

6. Apparatus according to claim 1, wherein said workpiece support assembly is an instrument support assembly adapted to support a stringed musical instrument, and wherein said instrument support assembly comprises:

a bar holder;

a bar having spaced holes extending therethrough both longitudinally and transversely;

means for fixing said bar in said holder an instrument support plate having a plurality of holes therein;

means for fixing said plate on said bar;

means communicating with said bar for holding the end of an instrument neck; and adjustable pin means attachable to said bar for supporting an instrument neck.

7. Apparatus according to claim 6 wherein at least some of said holes in said instrument support plate are elongated slots having closed ends.

8. Apparatus according to claim 1 wherein said means for attaching a workpiece to said workpiece support assembly is a plurality of workpiece clamps, each of said clamps comprising:

a pair of opposed jaws spaced on a support pin plate, each jaw having a workpiece contact end and a remote end;

a threaded thumbscrew threadedly engaging one jaw and bearing against the remote end of the other jaw; and a pivotal workpiece contact member at the workpiece end.

9. Apparatus according to claim 8 wherein the workpiece contacting face of each workpiece clamp is provided with a cushioning substance.

10. Apparatus according to claim 3, further comprising a wheel locking mechanism on at least one wheel to maintain the apparatus in a desired working position.

* * * * *